C. W. Wailey,

Cotton Bale Tie.

No. 2,486. Reissued Feb. 19. 1867

Witnesses:

Thos. J. Beck Jr.

Wm. R. Relton

Inventor:

Charles M. Wailey

N. PETERS, PHOTO-LITHOGRAPHER, WASHINGTON, D. C.

United States Patent Office.

CHARLES W. WAILEY, OF NEW ORLEANS, LOUISIANA.

*Letters Patent No.* 58,698, *dated October* 9, 1866 *reissue No.* 2,486, *dated February* 19, 1867.

IMPROVEMENT IN COTTON-BALE TIE.

The Schedule referred to in these Letters Patent and making part of the same.

TO ALL WHOM IT MAY CONCERN:

Be it known that I, CHARLES W. WAILEY, of the city of New Orleans, parish of Orleans, and State of Louisiana, have invented a new and improved Self-Fastening Cotton Tie or Buckle for baling cotton, wool, or other like substances, with bands or hoops of iron; and I do hereby declare the following to be a full, clear, and exact description of the same, reference being had to the annexed drawing, forming part of this specification, in which—

Figure 1:
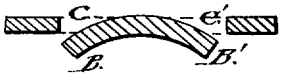

Figure 1 is a cross-section of my tie, bisected through its centre.

Figure 2:
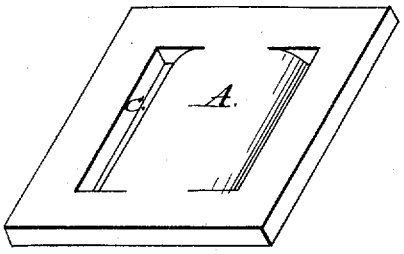

Figure 2, a perspective top view; and

Figure 3:
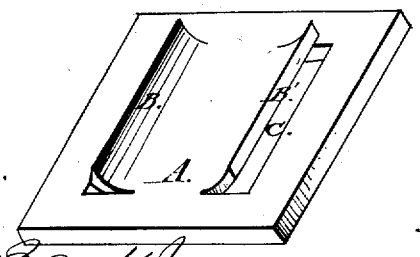

Figure 3, a similar bottom view.

My invention consists of a wrought or malleable iron self-fastening buckle or "tie," technically so called, about one inch and a half square, and one-tenth of an inch thick, and having two curved projecting lips on one of its sides that are cut by an implement or machine adapted to the purpose, and thrown out of the plane of the plate far enough to admit of the easy introduction of the band or hoop into the openings or slots produced by the cutting and projection of the lips, and so formed that there are no salient angles, points, or edges to abrade and injure the bands between the points or ends of the lips upon either surface thereof. Whenever there exist, in appliances of this kind, angles, points, or edges that come into contact with the band after the same has been applied to a bale, the result invariably is that the band is abraded and weakened by such contact, to such a degree as, sooner or later, to cause it to break. This, experience has abundantly demonstrated. Hence it was my first and greatest object, in fabricating my invention, to secure a total absence from it of these serious drawbacks to its efficiency, and, it will be perceived, I have fully attained that result. My tie presents both on its exterior and inner surfaces, between the points of the lips, a smooth and regular curvature that is unbroken by a single irregularity or the slightest degree of roughness. This formation necessarily causes the projecting lips themselves to assume curved proportions, and hence, properly, I call them curved projecting lips. It is this curvilinear form of my tie between the points of the lips that constitutes its chief merit and distinguishes it from every other tie of which I have any knowledge.

But, independently of and beyond the intrinsic comparative superiority of my invention, (considering its qualities with strict reference alone to its efficiency and fitness for the purpose for which it is intended,) by virtue of its peculiar mechanical construction as above described, it possesses the further marked advantage of being readily, easily, and economically manufactured by machinery, whereas those buckle ties that have the objectionable angles, edges, etc., between their projecting lips, to which I have referred, cannot be so manufactured except at such great cost as to make their production at once unprofitable and unwise. The reason of this arises out of the fact, that in order to make the said angles, edges, etc., such enormous pressure is required that nothing but the most ponderous machinery will answer the purpose. My buckle, on the contrary, can be manufactured with very slight and inexpensive machinery worked by hand.

On the drawings the buckle or tie, as an entirety, is marked A, the projecting lips B B′, the openings made by the displacement of the metal constituting the lips C C′.

The manner in which my tie is connected to the bands forming no part of my invention, it is not necessary to describe it. It is sufficient to say that the lips impinge upon the bands on the principle of the wedge, and hold them so firmly that they cannot slip or be drawn out of the buckle after the expansive force induced by the elasticity of the cotton within the bale comes into action, no matter how severe the strain or tension that is brought to bear upon the band by reason of such expansive force.

The advantages of my invention may be stated to be as follows, to wit: It is simple, and may be manufactured at smaller cost than any tie with which I have any acquaintance; it is so easily applied that the dullest laborer can adjust and use it without previous instruction; it is stronger than any part of a band; it can be used repeatedly; it does not require that the band shall be perforated with holes, to the injury of the same to a greater or less degree; it presents no projections to catch upon other objects after it is applied to a bale; it clamps the band with so secure and firm a gripe, that no compression of the bale, whether proceeding from a sudden jar or concussion, or from close packing within the hold of a ship, can unlock or cause the ends to fall asunder; and, finally, it has no salient angle, point, or edge to abrade, injure, and sever the band.

I am aware that metallic cotton ties or buckles, having vertical and angular projections and two or more openings or slots to receive the opposite ends of iron bands, are not new, such projections and openings being in E. V. Fassman's and Charles Swett's buckles. I therefore expressly disclaim the use of vertical and angular projections or lips.

But having fully described my invention, what I do claim, and desire to secure by Letters Patent, as a new article of manufacture, is—

The wrought or malleable iron self-fastening buckle or tie A, when provided with curved projecting lips B B′, and openings C C′, and otherwise constructed as described, for the purpose set forth.

CHARLES W. WAILEY.

Witnesses:

WM. R. SKELTON,

THOS. J. BECK, Jr.